Oct. 17, 1961　　　N. H. CHRISTENSON　　　3,004,588
CUTTING AND WELDING TORCH
Filed Aug. 13, 1959　　　　　　　　　　　2 Sheets-Sheet 1
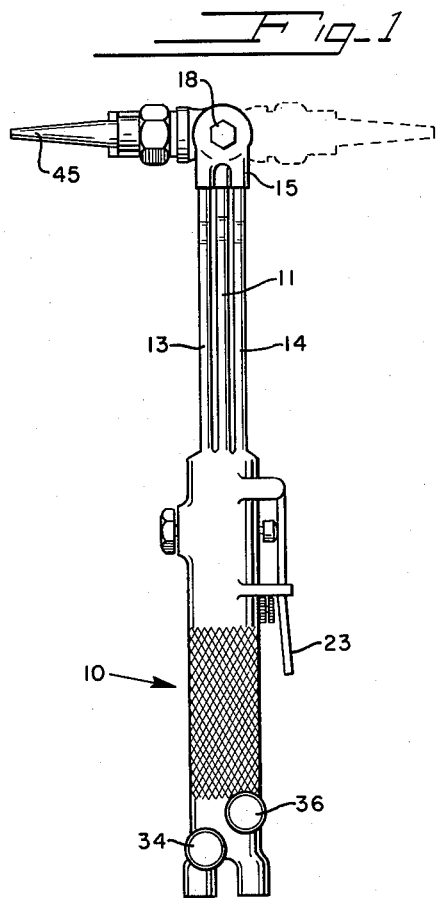
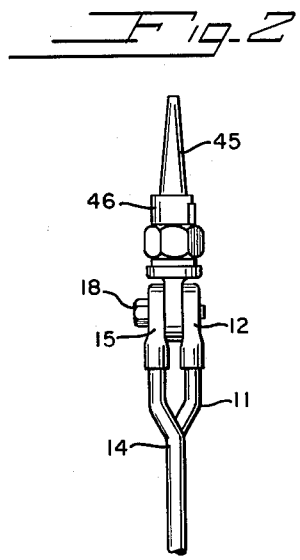
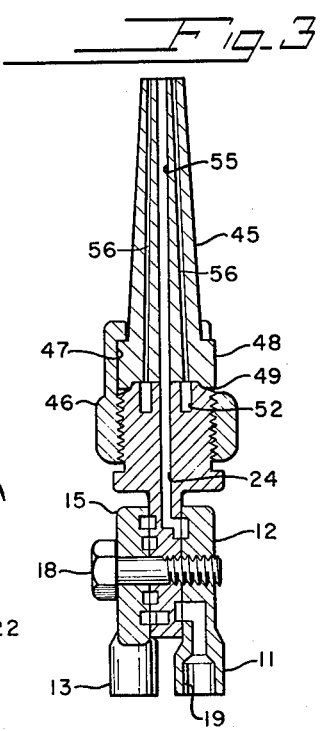
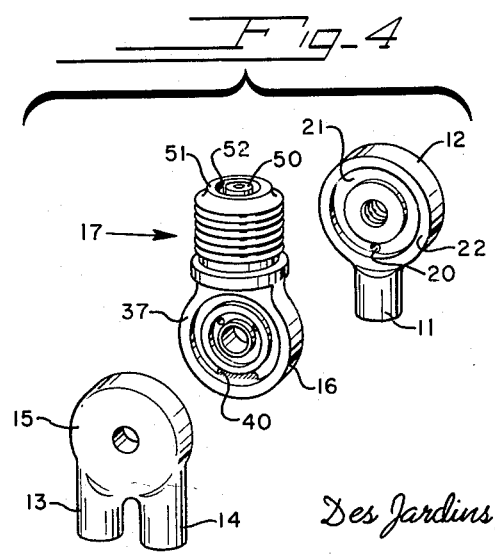
INVENTOR.
NILS H. CHRISTENSON
BY
Des Jardins, Robinson, Trutle & Schenk
HIS ATTORNEY

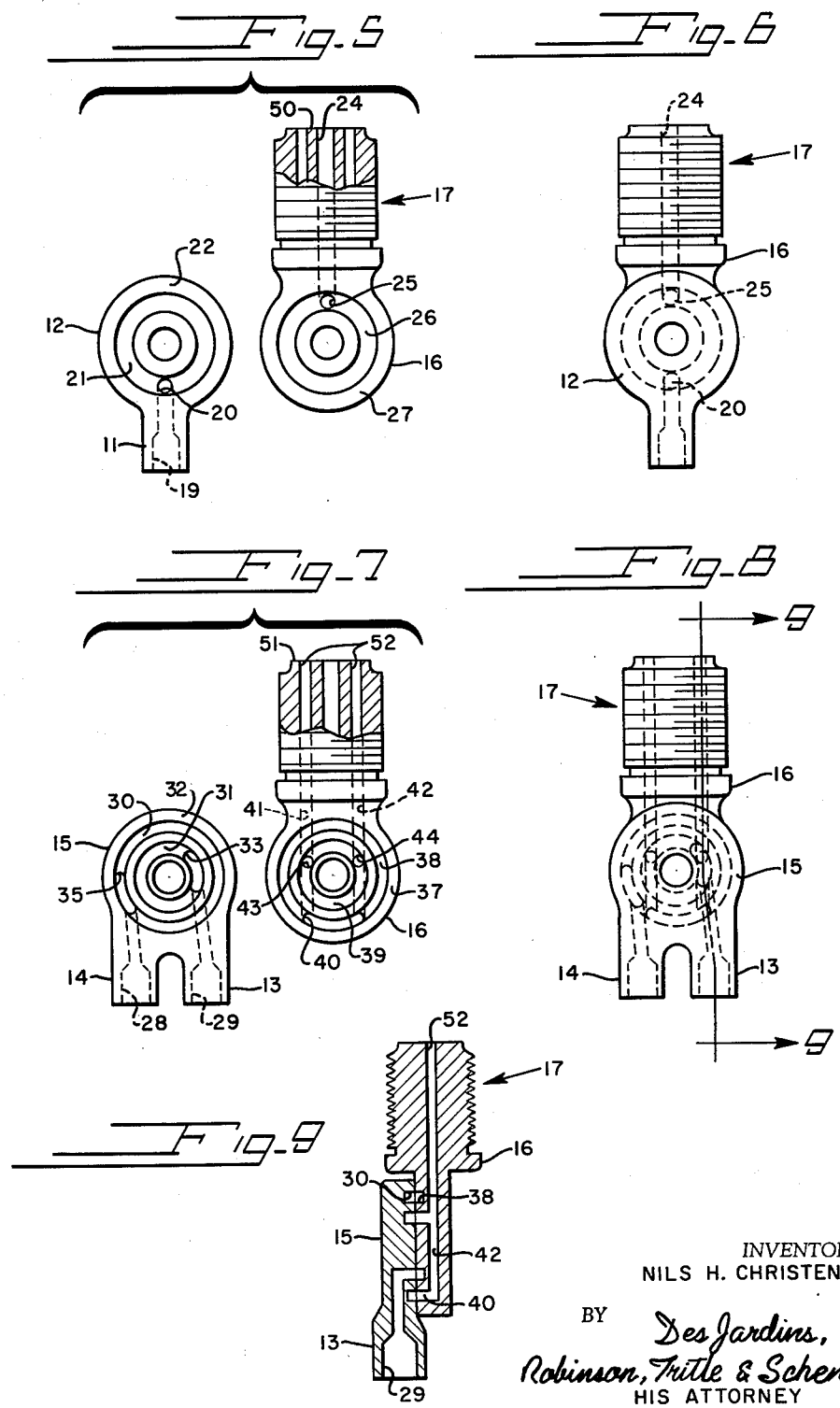

United States Patent Office 3,004,588
Patented Oct. 17, 1961

3,004,588
CUTTING AND WELDING TORCH
Nils Harry Christenson, 183 Fleming Road,
Cincinnati, Ohio
Filed Aug. 13, 1959, Ser. No. 833,589
6 Claims. (Cl. 158—27.4)

This invention relates generally to torches and more particularly to improved combination welding and cutting torches which are adapted to burn both oxygen and acetylene or propane gases.

The present invention is directed toward a cutting and welding torch in which oxygen and acetylene or propane gases may be used. In fabrication shopss, in the field and in construction work in general and in many other situations it often becomes necessary for the welding and cutting operations to be performed in a most inaccessible place where a fixed head torch cannot operate. There are on the market today torches having heads fixed at various angles, however, these are not satisfactory because the operator often finds that a change of angle is desirable or even necessary while performing the welding or cutting operation. The present torch is designed to permit this change of angle while the torch is in operation without extinguishing the flame or making any other adjustment other than changing the angular disposition of the head with respect to the handle portion of the torch. With a common fixed head torch the operator must first shut valves at the tanks or cylinders supplying the required gases, then remove or disconnect the torch from the hoses and attach another torch if he has one available. The availability of extra torches of course involves extra investment which is undesirable and in addition the worker loses time in making the change from one torch to another. Other torches on today's market are made up of a body handle to which either a cutting or welding nozzle may be attached as needed. The present invention is directed to a combination cutting and welding torch. It is to be understood of course that the instant invention may be used strictly as a welding torch or as a cutting torch by merely changing the nozzles or tips as they are referred to in the trade.

Therefore with the present invention whenever it is necessary to change the angle of the torch head, it is possible to accomplish this without shutting off the gas supply, disconnecting and substituting another torch, and relighting and adjusting the gas supply to obtain a proper flame on the torch.

In view of the above comments an object of the present invention is to provide a welding torch having a novel and improved adjustable head which may be oriented at any desired angle relative to the handle of the torch without extinguishing or making any other adjustsment whatever on the torch.

Another object of the present invention is to provide a novel welding torch having an adjustable head wherein the oxygen and acetylene gases are mixed in the adjustable head thereby eliminating flash-back and tube burn-out.

Another object of the present invention is to provide a welding torch having a novel and improved adjustable head and one that maintains a uniform flame in all orifices of the torch nozzle regardless of the angular disposition of said head.

Still another object of the present invention is to provide a welding torch adapted to burn oxygen and acetylene gases with means whereby the flow of the oxygen gas forms a seal which prevents leakage of the acetylene gas.

Another object of the present invention is to provide a welding torch with an adjustable head constructed of a metal having low friction, non-freezing and a "self lubricating quality" so as to eliminate the necessity of lubricating the moving parts of the adjustable head.

Another object of the present invention is to provide an oxygen-acetylene welding torch having a novel and improved adjustable head and means whereby a 50—50 mixture of oxygen and acetylene gas are supplied irregardless of the angular disposition of the adjustable head.

Another object of the present invention is to provide a welding torch characterized by its structural simplicity, the ease of assembly of its parts, its strong and sturdy nature and its low manufacturing cost. Other features of this invention reside in the arrangement and design of the parts for carrying out their appropriate functions.

Further objects of the present invention and certain practical advantages will be referred to in or will be evident from the following description of one embodiment of the invention, as illustrated in the accompanying drawings, in which:

FIG. 1 is a side elevational view of a torch handle provided with an adjustable head and nozzle attachment rotatable through at least 180° and embodying the present invention.

FIG. 2 is an end view of the flexible head;

FIG. 3 is an enlarged sectional view of the adjustable head and nozzle constsruction;

FIG. 4 is an enlarged exploded view of the adjustable head and head supporting hubs of the present invention;

FIG. 5 is an enlarged side view of the cutting oxygen supply hub and face and the center adjustable head, the latter having parts thereof cut away to more clearly show its construction;

FIG. 6 is an enlarged side view of the hub and head of FIG. 5 in an assembled condition.

FIG. 7 is an enlarged view of the other hub including two supply tubes and showing the inner face construction of the hub portion which supplies oxygen and acetylene gases and the center adjustable head and face thereof adapted to be connected with said hub;

FIG. 8 is an enlarged side view of the hub and head of FIG. 7 in an assembled condition.

FIG. 9 is a cross-sectional view taken along the plane of line 9—9 of FIG. 8 and showing the oxygen and acetylene inlet ports to the mixing passages for the oxygen and acetylene gases.

Before describing in detail the herein disclosed embodiment of the invention, it is to be understood that the present invention is not limited to the structural details or the particular arrangement of parts herein shown, as devices embodying the present invention may take other forms. It also is to be understood that the phraseology and terminology herein used are for purposes of description and not of limitation, as the scope of the present invention is denoted by the appended claims.

Referring to the drawings in which like numerals are used to designate like parts, a conventional torch having a handle 10 is shown in FIG. 1. The torch handle is provided with an arm consisting of tube 11 which terminates in a disc-like member or hub 12 and a second arm consisting of tubes 13 and 14 which terminate in a disc-like member or hub 15. The lower head portion 16, which is also disc-like, of adjustable head 17 is inserted and rotatably clamped between the hubs 12 and 15 by means of a bolt 18. The arm consisting of a single tube 11 is provided with a passage 19 which communicates, via port 20, with an annular groove 21, provided on the inside face 22 of the hub 12, as most clearly shown in FIGS. 4 and 5. Oxygen gas is fed through the passage 19 from a suitable supply line attached to the opposite end of the handle 10. This source of oxygen supplies the cutting oxygen and is controlled by quick acting valve which is actuated by lever 23. A single center passage 24 through the head 17 communicates, via port 25, with an annular groove 26 in the face 27 of the lower head portion 16. The groove 25 has a diameter similar to the groove 21 of the hub 12 and is disposed so that when the inside face 22 of the hub 12 is placed against the face 27 of the lower head portion 16 in a manner as shown in FIGS. 3 and 6 the annular grooves 21 and 26 register with each other and provide communication between the passage 19 of the tube 11 and the central passage 24 of the head 17.

The second arm associated with the handle consists of two tubes 13 and 14. Tubes 13 and 14 have passages 28 and 29 respectively which communicate with spaced outer and inner annular grooves 30 and 31 respectively provided on the inside face 32 of hub 15, as seen in FIGS. 7, 8 and 9. Acetylene gas is fed through the passage 29 and is adapted to enter the inner annular groove 31, via port 33, as seen in FIG. 7. The acetylene gas is supplied from suitable supply lines attached to the opposite end of the handle 10 and the flow thereof is controlled by a suitable valve 34, as shown in FIG. 1. Oxygen is fed through passage 28 and is communicated to the outer annular groove 30 by means of port 35, as seen in FIG. 7. The oxygen is supplied to the handle via the same supply line as the cutting oxygen, however, it has a separate branch line from the cutting oxygen which is controlled by the valve 36, as seen in FIG. 1. The lower head portion 16 is provided with a second face 37, as seen in FIG. 7, which in turn is provided with an outer annular groove 38 and an inner annular groove 39. The outer and inner grooves 38 and 39 on the face 37 of the lower head portion 16 have the same diameter as the outer and inner grooves 30 and 31 respectively of the hub portion 15. The inner and outer grooves 31 and 30 and the inner and outer grooves 39 and 38 respectively are complementary and are adapted to register with one another when the face 32 of the hub 15 is placed against the face 37 of the lower head portion 16, as shown in FIGS. 8 and 9. As seen in FIGS. 7 and 9 the outer annular groove 38 of face 37 is provided with an elongated arcuate port 40 which extends inwardly toward the central portion of lower head portion 16 as seen in FIG. 9 and communicates with spaced mixing passages 41 and 42. Mixing passages 41 and 42 extend upwardly through the head 17 on either side of, but separated from the central passage 24.

The inner annular groove 39 of face 37 is provided with a pair of spaced ports 43 and 44 which also communicate with the spaced passages 41 and 42 respectively, as seen in FIGS. 7 and 9.

The flow of oxygen is thus seen to be supplied to the welding nozzle 45 via passage 28 of tube 14 through port 35 to the outer annular groove 30 of hub 15, to outer annular groove 38 of face 37 of lower head portion 16, through port 40 to the spaced mixing passages 41 and 42 and outwardly through the head 17 to the nozzle 45. The flow of acetylene is from passage 29 of tube 13, to inner annular groove 31, via port 33, of hub 15, to inner annular groove 39 of face 37 of lower head portion 16 through ports 43 and 44 into mixing passages 41 and 42 respectively, and then upwardly and outwardly through the head 17 to the nozzle 45.

In final assembly the lower head portion 16 is contained, as seen in FIG. 3, between the spaced hubs 12 and 15 by means of bolt 18 which is shown to project through suitable bores provided in the hub 15 and lower head portion 16 and threadedly engages a threaded bore provided in hub 12, as seen in FIG. 3. The end of the bolt is preferably provided with a hexagonal head to more readily accommodate a wrench.

It will be understood that while the annular grooves provided in the hubs 12 and 15 cooperate and register with their respective annular grooves provided in the faces 27 and 37 of the lower head portion 16, those portions of the faces between and adjacent to the annular grooves of the hub portions cooperate with the portions of the faces 27 and 37 between and adjacent to the annular grooves of the lower head portion 16 in a manner wherein a sealing surface contact is maintained, as seen in FIGS. 3 and 9, so that there is no communication between the outer and inner grooves other than in the mixing passages 41 and 42 and a seal is provided to prevent gas leakage to the exterior thereof.

In prior devices the mixing of the oxygen and acetylene gases into a combustible mixture occurred in the main body portion of the torch and if a leak occurred at the head portion the sparks which are created during the welding operation often caused the combustible mixture to become ignited and since this combustible mixture extended all the way back to the body portion of the handle, a flashback would occur and burn out the tubes. With the present device mixing of the oxygen and acetylene gases does not occur in the body of the torch and there is no combustible mixture communicated through the tubes 13 and 14. The mixture of the oxygen and acetylene occurs only in the head at the points where acetylene supply ports 43 and 44 intersect the mixing passages 41 and 42 respectively, as seen in FIG. 7. Thus, through the provision of the present invention it is impossible for a flash-back to occur which will burn out the tubes 13 and 14.

Through the provision of continuous annular grooves in the hub portions 12 and 15 which are adapted to register with similar continuous annular grooves provide the faces 27 and 37 of the lower head portion 16 the ssupply of oxygen and acetylene gases is not interrupted during an adjustment of the head since the grooves are maintained in the same continuous registration with one another during adjustment of the head. Furthermore, the quantity of oxygen and acetylene supplied does not vary with a change in the angular disposition of the head since the turning of the head has no effect on the quantity of oxygen and acetylene contained in and supplied through their respective grooves and ports.

The present construction provides another very important safety advantage in that it completely eliminates the possibility of combustible acetylene leakage to the exterior of the head. The oxygen will not burn by itself and must be mixed with acetylene in order to become combustible. The pressure at which the oxygen is normally supplied in a torch of this type is slightly greater than the pressure under which the acetylene is supplied, the oxygen is therefore supplied to the outer annular grooves 30 and 38 which completely encircle the inner annular acetylene grooves 31 and 39 thereby creating a pressure directed inwardly toward the center of the hub and the lower head portions to confine the acetylene. Since the pressure under which the acetylene is supplied is less than that under which the oxygen is supplied the acetylene pressure is not great enough to force its way out beyond the oxygen contained in the outer grooves or on the atmospheric side of the acetylene. Thus, by eliminating the leakage of acetylene the danger of a flash in the area where the torch is being used due to such leakage is eleminated.

Since it is intended that the head 17 may be adjusted while the torch is in operation, the bolt 18 is adjusted to give the desired drag between the spaced hub members 12 and 15 and the lower head portion 16. It is desirable that no oil or hydrocarbon be used as a lubricant for these movable parts thus it becomes necessary that the material used for the construction of these members have special "self lubricating" characteristics to give long trouble free service. Such characteristics are found in a product sold under the trademark "Amco Metal" which is substantially an alminum-bronze combination and has low friction and non-freezing qualities, and is supplied in a number of grades. Grade No. 20–23 is most desirable for the present purpose and the approximate composition thereof is alumanum 11–12%, iron 3½–4½%, copper 83% approximately, others ½%. Further characteristics of this metal are that it is anti-gall, it tends to be self lubricating and forms a very tight seal and smooth joint; the metal is tougher and harder than regular bronze, and it is not readily subject to deformation so that it retains its required shape which is most important in the present application. We refer to this metal as a "self lubricating metal" for when used in the present construction it has been found that no additional lubrication is required.

Another important feature of the present invention is that it makes possible the continuous unvarying supply of a 50—50 oxygen-acetylene mixture which is most desirable. With prior welding devices of this type there was always a variance in the amount of oxygen and/or acetylene being supplied. This is believed to be due to a variance in the distance between the inlet oxygen port and the inlet acetylene port and as the head was adjusted the amounts of gas supplied would vary, this caused the flame to constantly change and made for bad welding conditions. With the present invention the supply of oxygen and acetylene at the mixing points, in mixing passages 41 and 42 may always be maintained at the desirable 50—50 ratio. This is true because the ports 40, 43 and 44 in the lower head portion 16, as seen in FIGS. 7 and 8, as the head 17 is revolved, revolve within their respective oxygen and acetylene grooves, which grooves are supplied with a constant flow of oxygen and acetylene under a standard pressure so that the quantity of the two gases entering the mixing passages 41 and 42 via ports 43, 44 and 40 provided in the lower head portion 16 is always uniform and constant.

Since the cutting oxygen supplied through tube 11 is normally supplied at a higher pressure than either of the pre-heat gases (oxygen-acetylene) the provision of supplying the cutting oxygen on one side (face 27) of the head 17 while supplying the pre-heat gases on the other side (face 37) of the head, with no connection therebetween, is particularly advantageous and essential since leakage from one to the other would prevent the torch from functioning properly, in view of the different pressures between the cutting oxygen and the pre-heat oxygen. It will be understood that the (oxygen-acetylene) gases produce a welding flame with the use of a proper welding nozzle and a pre-heat flame when the cutting oxygen is utilized.

The head member 17 is shown provided with a nozzle connection member 46 having a socket 47 therein which is accessible by means of an opening provided in the side thereof. A cutting nozzle 45 is shown and has a flanged base 48 which is readily inserted and removed from the socket 47 in the connection member 46. The flanged head of the nozzle is extended to provide an annular lip 49, see FIG. 3, projecting beyond the face of a nozzle seat which abuts the bottom portion of the nozzle and is provided at the upper end of the head 17. The nozzle seat in the end of the head 17 consists of a face having an inner annular flange 50 and an outer annular flange 51 between which is an annular groove 52, see FIG. 4. The passages 41 and 42 through the head 17 communicate with an annular groove 52 and the single center passage 24 opens on the seat of the head within the radius of inner annular flange 50.

The nozzle is provided with a central passage 55 which communicates with the central passage 24 in the head 17. Additional passages 56 are provided in the nozzle and connect with the annular groove 52 in the head 17 and communicate with a plurality of openings provided in the tip of the nozzle which are preferably disposed radially about the central passage way 45. The flame end of the different nozzles used with the instant torch may be of different types commonly used in the art, but the ends which fit into the connection member 46 are all made of the same standard size construction in order for the connection to accommodate any type nozzle and permit ready assembly and removal from the connection member 46 on the head 17. The lip 49 further serves as a guard to protect the end of the nozzle if the same should be accidentally dropped. The side opening in the collar or nut attachment for the nozzles makes possible many and varied types of nozzles, each designed for special work. The nozzles may be inserted through the side opening without the necessity of inserting the entire nozzle through a collar or nut as has heretofore been the practice, there are no limitations whatever as to the size or form of the remainder of the nozzle which may be used. The nozzle connection member need not be removed, for removal or insertion of the nozzle, and the possibility of damage to the screw threads on the nozzle connection member is thereby eliminated. The connection member is always on the head to protect the screw threads thereon and the end of the head against which the nozzle seats.

In view of the foregoing description, taken in conjunction with the accompanying drawings, it is believed that a clear understanding of the construction, operation and advantages of the device will be quite apparent to those skilled in this art.

Having thus described my invention, what I claim is new and useful and desire to secure by United States Letters Patent is:

1. A torch construction comprising a handle with two arms terminating in first and second disc-like members having opposing first and second faces respectively to which is pivotally attached an adjustable head member having first and second faces adapted to abut said first and second faces of said disc-like members respectively, one of said arms comprising a pair of first and second tubes having passages therein, spaced inner and outer annular grooves provided in the face of said first disc-like member, a first port communicating between said first tube and said inner groove and a second port communicating between said second tube and the outer groove, spaced inner and outer grooves provided on said first face of said head member adapted to register with said inner and outer grooves of said first disc-like member when in abutting relationship therewith and in all angular positions of said adjustable head, a passage through said head having ports communicating with both said inner and outer grooves in said first face of said head, said other arm comprising a tube having a passage therein, said second disc-like member having a groove provided in the face thereof communicating with said tube of said second arm, a groove provided in the second face of said head adapted to register with said groove in said second disc-like member when said faces are in abutting relationship and in all angular positions of said adjustable head, and a passage through said head communicating with said groove in said second face thereof.

2. The combination of claim 1 wherein said first and second disc-like members and said adjustable head member are constructed of an aluminum-bronze metal combination having the characteristics of being anti-gall and self lubricating and forming a very tight and smooth joint whereby no additional lubrication is required between said parts of the torch.

3. An acetylene torch construction comprising a handle with two arms terminating in first and second disc-like members having opposing faces to which is pivotally attached an adjustable head member having first and second faces adapted to abut said first and second faces of said disc-like members respectively, one of said arms comprising an oxygen supply tube and an acetylene supply tube, spaced inner and outer grooves provided between the faces of said first disc-like member and said first face of said head member, ports communicating one of said acetylene supply tube to said inner groove and said oxygen supply tube to said outer groove, passages through said head having ports communicating with said inner and outer grooves, said other arm comprising a cutting oxygen supply tube having a passage therein, a groove provided between the faces of said second disc-like member and said second face of said head member, a central passage way through said head communicating with said groove between said second faces, said head having an end seating face with a marginal groove, said marginal groove communicating with said passages in said head having communication with said inner and outer grooves, said central passage having an opening in said end seating face within the confines of said marginal groove, a nozzle having a flanged end adapted to be clamped against said seating face, said nozzle having a central passage and opening in the top thereof communicting with said central passage of said head and a second passage in said nozzle communicating with said marginal groove, said second passage in said nozzle terminating in a plurality of apertures in the tip of said nozzle, said apertures being spaced radially about said central opening in the tip of said nozzle, and means for securing said nozzle on said head.

4. A torch construction comprising a handle having two arms, a first of said arms comprising a pair of hollow tubes terminating in a first disc-like member, a substantially flat surface face on said first disc-like member, the second of said arms terminating in a second disc-like member having a face opposing said face of said first disc-like member, a pair of spaced inner and outer annular grooves formed in said face of said first disc-like member, ports connecting said inner groove to one of said tubes and said outer groove to the other of said tubes, means for pivotally mounting an adjustable head between said opposing faces of said disc-like members, said head member provided with a disc-like portion having faces for abutting the opposing faces of said disc-like members, one of said faces of said head being provided with spaced inner and outer annular grooves, said inner and outer grooves of said head adapted to register with said inner and outer grooves provided on the face of said first disc-like member, said pairs of inner and outer grooves combining in inner and outer grooves which lie in a common plane, said inner groove adapted to receive an explosive fluid and said outer groove adapted to receive a non-explosive fluid at a higher pressure than said explosive fluid whereby said outer groove and fluid forms a seal around said inner groove and fluid, said head having a plurality of passages therethrough communicating with said inner and outer grooves thereby providing a passage between said spaced tubes and said plurality of passages in said head at any angular position to which said head is adjusted relative to said handle, said second arm comprising a tube, an annular groove provided in said second disc-like member communicating with said tube, an annular groove provided in the other of said faces of said head, a central passage through said head communicating with said groove, whereby said tube of said second arm communicates with said central passage in said head at any angular position to which said head is adjusted on said handle.

5. A torch construction comprising a handle having two arms, each of said arms terminating in a disc-like member, means pivotally mounting an adjustable head between said disc-like members, said head member provided with faces for abutting opposing faces of said disc-like members, spaced inner and outer annular grooves being provided on at least one of said faces, means communicating with said inner and outer grooves for supplying a first explosive fluid to said inner groove and a second non-explosive fluid to said outer groove, said inner and outer grooves lying in a common plane, said outer groove and non-explosive fluid forming a seal around said inner groove and explosive fluid to prevent escape of said explosive fluid to the atmosphere, said communicating means associated with one of said disc-like members, said head having passage means therethrough communicating with both said inner and outer grooves at any angular position to which said head is adjusted relative to said handle, thereby providing continuous fluid communication between said communication means and said passage means and said first and second fluid being mixed in said passage means, an annular groove being provided between the remaining disc-like member and head face, a central passage through said head communicating with said groove at any angular position to which said head is adjusted on said handle, and second communication means supplying a third fluid associated with said second arm and communicating with said groove.

6. A torch construction comprising a handle having two arms, each of said arms terminating in a disc-like member, means pivotally mounting an adjustable head between said disc-like members, said head member provided with faces for abutting opposing faces of said disc-like members, spaced inner and outer annular grooves being provided on at least one of said faces, means communicating with said inner and outer grooves for supplying a first explosive fluid to said inner groove and a second non-explosive fluid to said outer groove, said inner and outer grooves lying in a common plane, said outer groove and non-explosive fluid forming a seal around said inner groove and explosive fluid to prevent escape of said explosive fluid to the atmosphere, said communicating means associated with one of said disc-like members, said head having passage means therethrough communicating with both said inner and outer grooves at any angular position to which said head is adjusted relative to said handle, thereby providing continuous fluid communication between said communicating means and said passage means and said first and second fluid being mixed in said passage means, an annular groove being provided between the remaining disc-like member and head face, a central passage through said head communicating with said groove at any angular position to which said head is adjusted on said handle, and second communication means supplying a third fluid associated with said second arm and communicating with said groove, said disc-like terminal members and said head member being constructed of a combination aluminum-bronze metal having low friction and non-freezing qualities and having a composition of approximately 9%–14% aluminum, 2%–5% iron, 80%–85% copper, which is anti-gall and tends to be self-lubricating so as to eliminate the necessity of oiling said movable parts.

References Cited in the file of this patent

UNITED STATES PATENTS

| 1,121,457 | Bell | Dec. 15, 1914 |
| 1,205,195 | Gumz | Nov. 21, 1916 |
| 1,806,788 | Cross et al. | May 26, 1931 |
| 1,851,377 | Taylor | Mar. 29, 1932 |
| 1,980,636 | Roumillat | Nov. 13, 1934 |
| 2,169,371 | Payne | Aug. 15, 1939 |
| 2,870,051 | Klement | Feb. 21, 1957 |
| 2,874,042 | Klement | Oct. 1, 1957 |